United States Patent

[11] 3,594,765

[72] Inventors Claude Paul Henri Lerouge Maurepas; Marc Andre Regnier, Aulnay-Sous-Bois; Didier Charles Strube, Garches, all of, France

[21] Appl. No. 786,918
[22] Filed Dec. 26, 1968
[45] Patented July 20, 1971
[73] Assignee International Standard Electric Corporation New York, N.Y.
[32] Priority Jan. 3, 1968
[33] France
[31] 134640

[54] TIME DIVISION MULTIPLEX ANALOG-DIGITAL OR DIGITAL-ANALOG CONVERTER
10 Claims, 17 Drawing Figs.

[52] U.S. Cl. 340/347 AD, 235/92 SH
[51] Int. Cl. H03k 13/02
[50] Field of Search 235/92, 165; 340/347; 307/220, 221, 223; 328/37, 42, 43, 48, 46

[56] References Cited
UNITED STATES PATENTS
2,997,233 8/1961 Selmer 235/92
3,314,015 4/1967 Simone 235/165

*Primary Examiner*—Daryl W. Cook
*Assistant Examiner*—Charles D. Miller
*Attorneys*—C. Cornell Remsen, Jr., Walter J. Baum, Paul W. Hemminger, Percy P. Lantzy and A. Donald Stolzy

ABSTRACT: A plurality of binary counters are provided, each of which are assigned to a different channel signal, and arranged in two groups. A timing signal source and logic circuitry associated with each counter cooperate to cause the counters of one group to convert the analog or digital signal of that group and simultaneously connect the counters of the other group in series and to function as shift registers to produce the serial output of previously coded analog signals or to store serial digital input codes. The function of the counters are then reversed. When functioning as analog-digital converters, the counters start counting and the analog signals are compared to a reference sawtooth waveform. When the amplitude of the analog signal equals the amplitude of the waveform, the counting is stopped and the code stored therein represents the amplitude of the analog signal. In the digital-analog converter, the counters of a group which store digital codes previously shifted into these counters start counting and cooperate with a bistable device to produce PWM pulses which is operated on to reproduce the analog signals.

Inventors
CLAUDE P. H. LEROUGE
MARC A. REGNIER
DIDIER C. STRUBE
By Alfred C. Hill
Agent Inventors
CLAUDE P. H. LEROUGE
MARC A. REGNIER
DIDIER C. STRUBE
By Alfred C. Hill
Agent Inventors
CLAUDE P. H. LEROUGE
MARC A. REGNIER
DIDIER C. STRUBE
By Alfred C. Hill
Agent Inventors
CLAUDE P. H. LEROUGE
MARC A. REGNIER
DIDIER C. STRUBE
By Alfred C. Hill
Agent

TIME DIVISION MULTIPLEX ANALOG-DIGITAL OR DIGITAL-ANALOG CONVERTER

BACKGROUND OF THE INVENTION

The present invention relates to a digital converter and more particularly to a digital converter that may be employed as a time division multiplex analog-to-digital converter of the amplitude comparison type having a fixed coding duration, or as a time division multiplex digital-to-analog converter.

A prior art coder having fixed coding duration for processing the analog signals received over a certain number of independent channels has been described. This coder presents the advantage that it does not comprise any circuits for sampling and for storing the analog signals to be coded. In this coder, the analog signal channels are divided into two groups G1, G2 and the amplitudes of the analog signals of the two groups are coded alternately by comparing them to a ramp (sawtooth) or staircase signal.

If, : $Fs$= sampling frequency, $Tz$= duration of the cycle of the ramp or staircase signal, and $Tc$= duration of the coding cycle, the following relations are derived—$Tc=1/Fs$ and $Fs=1/2Tz$.

At each odd cycle, $Tz1$, of the ramp signal, the analog signals received on the group of channels G1 are compared to the ramp signal. As soon as the amplitude of the analog signal on the channel $Vj$ is equal to that of the ramp signal, the number shown by a coding counter which advanced in synchronism with the amplitude of the ramp signal, is written, on the line reserved to the channel $Vj$, in a first memory $M1$ so that, at the end of the cycle, each line of this memory contains the number corresponding to the amplitude of the corresponding analog signal. During the next even cycle, $Tz2$, the same operation is carried out for the channels of the group G2, the numbers of which are written in a second memory M2. At the same time, the numbers stored in the memory M1 are transmitted in series form towards the utilization circuits. If $m$ designates the number of channels, and if $n$ designates the number of binary digits of a code, each of the memories must store $(m/2)$ $n$-digit words. The memories may take the form of either a matrix form, or $m/2$ registers of length $n$. In both cases, the access circuits and the memories are complicated, since they include a great number of electronic gates and they are controlled by channel time slot and digit time slot signals. This complication is greatly increased when the number of channels $m$ is high, for instance, where $m$=600.

SUMMARY OF THE INVENTION

An object of the present invention is to provide a coder which is less complicated then the above mentioned prior art coder.

Another object of this invention is to provide components for a digital code converter that may be employed in an analog-to-digital converter and also in a digital-to-analog converter.

A feature of this invention is the provision of a digital code converter for converting analog signals to digital codes and visa versa comprising a source of timing signals defining a first given time interval and a second given time interval different than the first time interval; binary counting means; and logic circuit means coupled to the counting means and the source, the logic circuit means responding to the timing signals to connect the counting means as a cyclic counter for one of the first and second time intervals and to connect the counting means as a shift register for the other of the first and second time intervals.

In the present invention the coder which operates according to the principle stated hereinabove, each channel circuit is practically independent and comprises first a comparator, second an $n$-digit binary counter or register and third a logic circuit which connects the counter as a cyclic counter during coding and as a shift register during transmission.

For the coding, a pulse generator delivers signals of frequency $m \times n \times Fs$ which are applied to each counter which generates a string of $2^n-1$ different codes during the rise time of the ramp signal. When the comparator delivers an equality signal, the advance of the counter is stopped and the code written therein corresponds to the amplitude of the analog signal.

For the transmission, the counter is connected as a shift register at the next cycle of the ramp signal and the $m/2$ counters are connected in series, one following the other. The signals of the pulse generator are applied to one end of this chain and the codes are obtained at the other end in series form.

It is thus seen that this coding process presents a considerable simplification with respect to the previous technique, since it does not use other signals than those delivered by a pulse generator, and since it comprises a very reduced number of electronic gates.

In particular, it is not necessary to generate channel time slot and digit time slot signals. Last, the number of channels may be modified very easily only by changing the transmission speed.

The decoding is carried out with the same counter and logic circuits. The received serial digital codes are introduced into the counters connected as shift registers, and the decoding is accomplished by means of the counters connected as cyclic down-counters. The output signals are obtained by means of digital bistable circuits (flip-flops) operating to produce (PWM) pulse-width modulation signals, the manner of converting the PWM signals into amplitude modulation being well known.

The invention is characterized by the fact that the $m$ channels are distributed into two groups of $m/2$ channels, that the frequency of the ramp signal Z is equal to twice the sampling frequency, that the channels of the two groups are coded alternately during the odd cycles for those of the first group, and during the even cycles for those of the second group, and that the codes of the first group and of the second group are transmitted in series form during, respectively, an even cycle and an odd cycle.

Another characteristic of the invention lies in the fact that the duration $Tz=2^n \times ta$ of each cycle is defined by an $n$-digit binary counter, that the return time of the signal Z is chosen equal to $ta$, that the duration of the time of transmission of the codes of each group of channels is also $Tz$ with $Tz=[m/2 \times n)+y] \times tb$ so that the system is defined by the equation $tb/ta= 2^{n+1}/m \times n2y$, $y$ being the number of synchronization digits transmitted at each cycle, $ta$ and $tb$ being, respectively, the digit time slot for coding and the digit time slot for transmission.

Another characteristic of the invention lies in the fact that each channel has associated therewith an independent channel circuit which comprises an $n$-digit binary counter or register and logic circuit which, under the action of a first control signal, causes the logic circuit to connect the counter to operate as a cyclic counter of capacity $2^n-1$ codes and which, under the action of a second control signal, causes the logic circuit to connect the counter to operate as a shift register and that, in the case where $ta=tb$ and $n=7$, $m=32$, $y=16$, said counter receives advance signals delivered by one common $(n+1)$ digit coding counter, operating in natural binary code, coupled to the pulse generator the control signals to the channel counters being delivered by the $(n+1)^{th}$ flip-flop of said common counter.

Another characteristic of the invention lies in the fact that, for the coding, the $m/2$ counters receive advance signals between the beginning of the cycle and the time of equality between the signal Z and the analog signal to be coded, that at the next cycle the $m/2$ counters of one group of channels are connected in series constituting one single shift register with $(m \times n)/2$ digits, and that the content of these counters is transmitted in series form under the control of the advance signals.

Another characteristic of the invention lies in the fact that in the decoder, the codes received in series form are written during an odd cycle in the counters of the first group of channel circuits connected as a shift register, that at the next even cycle each counter of said group of circuits operates as a cyclic counter, that a channel flip-flop is set to the 1 state when the counter shows the code corresponding to zero and that said flip-flop is reset to the 0 state at the end of the cycle so that a PWM signal is obtained which represents the value of the analog signal decoded by this channel.

Brief Description of the Drawing

The above-mentioned and other features and objects of this invention will become apparent by reference to the following description taken in conjunction with the accompanying drawings, in which.

Description of the Preferred Embodiments

Figure 1:
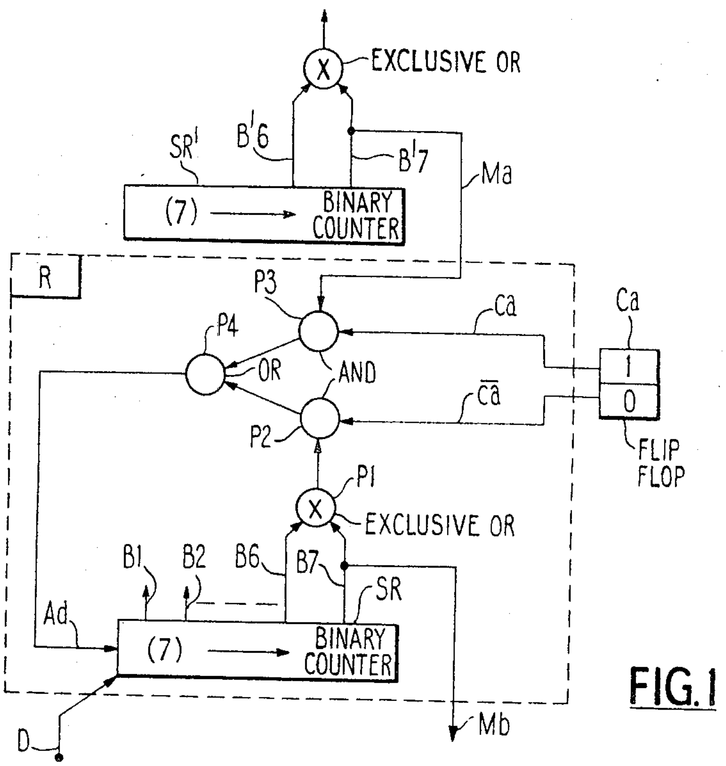
FIG. 1 is a block diagram of a circuit which may operate either as a shift register or as a cyclic counter.

FIG. 1 illustrates in the block referenced R the detailed diagram of a circuit which may operate either as a shift register, or as a cyclic counter, according to whether flip-flop C*a* is in the 1 state or in the 0 state. It comprises binary counter SR including $n=7$ flip-flops, the outputs of which are referenced B1, B2...B7; and the logic circuit including EXCLUSIVE OR P1, AND gates P2, P3 and OR gate P4. It should be noted that the counter may be constituted by JK flip-flops.

Counter SR receives the input signals on its input A*d* and the clock or advance signals on its input D. When flip-flop C*a* is in the 1 state, and when the logical condition $Ad=Ma \times Ca$ is fulfilled, the first clock signal D controls the shifting by one rank towards the right of the contents of the counter and the writing of a 1 digit in the first flip-flop. For the condition $\overline{Ad}=\overline{Ma} \times Ca$, the same clock signal controls the writing of a 0 in this flip-flop. The signal M*a* is supplied by counter SR', identical to counter SR, when its right-hand flip-flop (output B'7) is in the 1 state. Counter SR delivers a signal M*b* to the following counter for the same condition. It results therefrom that, if several circuits R are connected in series, the codes shown therein in parallel form appear in series form on the output M*b* of the last of the counters.

When flip-flop C*a* is in the 0 state, AND P2 delivers a signal A*d* when EXCLUSIVE OR P1 is energized for the logical condition $B6 \times \overline{B7} + \overline{B6} \times B7$ and a 1 digit is written in the first flip-flop at the first signal D. When circuit P1 is blocked, a 0 is written in this flip-flop. Counter SR displays then a cyclic series of $2^n-1$ codes as it may be checked for the code with $n=3$ digits shown in the following TABLE.

In this TABLE, the 3 digits are referenced B1, B2, B3 and the $2^n-1=7$ codes are referenced K1 to K7.

TABLE

| | B1 | B2 | B3 |
|---|---|---|---|
| K1 | 1 | 1 | 1 |
| K2 | 0 | 1 | 1 |
| K3 | 0 | 0 | 1 |
| K4 | 1 | 0 | 0 |
| K5 | 0 | 1 | 0 |
| K6 | 1 | 0 | 1 |
| K7 | 1 | 1 | 0 |
| K1 | 1 | 1 | 1 |

The code K1 shown initially in the counter is the code which comprises 1's on all its positions. The digits B2 and B3 are applied to EXCLUSIVE OR P1 (modulo 2 addition) which delivers a 0 which constitutes the digit B1 of the code K2, the digits B2 and B3 of this code being the digits B1 and B2 of the code K1. The other combinations are obtained by repeating the same operation.

Figure 2:
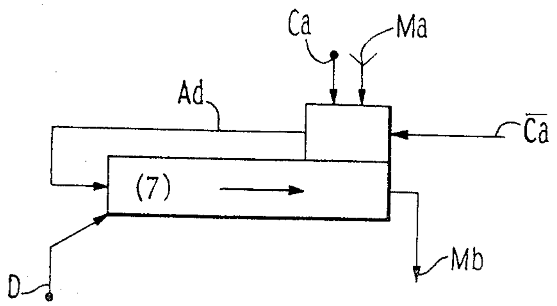
FIG. 2 illustrates the symbol of the circuit of FIG. 1 employed in FIG. 5.

FIG. 2 is a symbolic representation of the circuit R with the inputs D, C*a*, M*a*, $\overline{Ca}$, M*b* and A*d* as defined previously.

Figure 3:
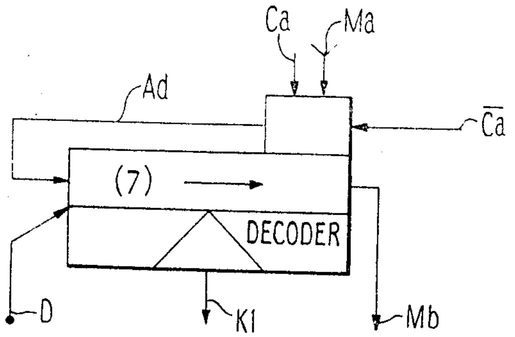
FIG. 3 illustrates the symbol, including the symbol of FIG. 2 and an associated decoder, as employed in FIG. 6.

FIG. 3 is a symbol similar to that of FIG. 2 but to which has been added a decoder delivering a signal K1 when all its flip-flops are in the 1 state (code K1 of the table).

Before describing a particular example of the coder according to the invention, its principle of operation will be stated in the general case for any value of *m* (number of channels) and of *n* (number of digits).

Figures 4A, 4B, 4C, 4D, 4E, 4F:
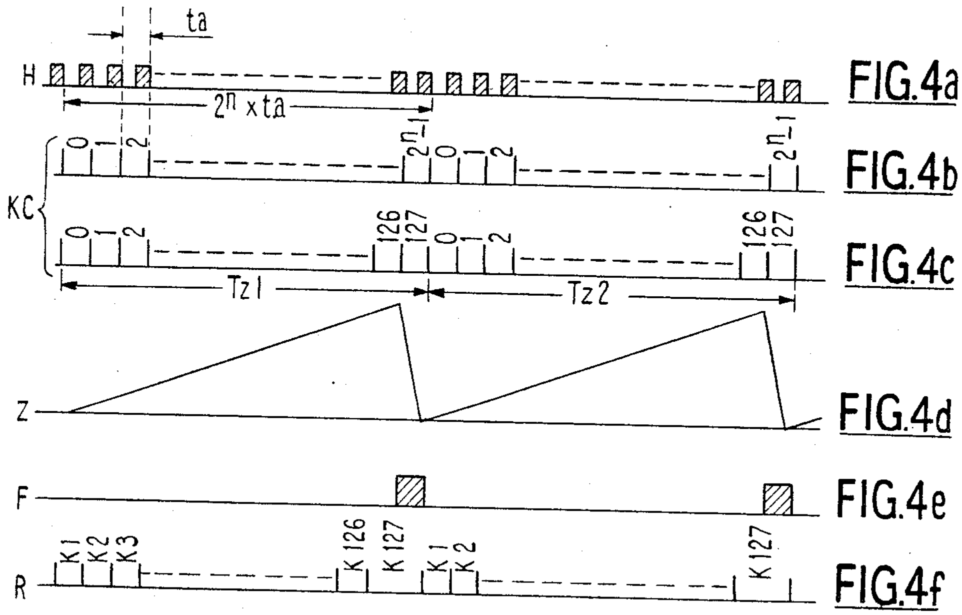
FIGS. 4*a* to 4*f* illustrate diagrams of signals related to the operation of the coder.

The duration of each coding and transmission time is defined by an *n*-digit binary counter and corresponds to the successive display of the codes 0, 1, 2...$2^n-1$ as indicated on the diagram of FIG. 4*b*. This duration is equal to $2^n \times ta$.

FIG. 4*d* illustrates two successive cycles Tz1, Tz2 of duration Tz of the ramp reference signal having a rise time of $(2^n-1) \times ta$ and a return time defined by the signal F of FIG. 4*e* (this signal appears when the timing signal counter shows the code $2^n-1$).

The coding of the *m*/2 channels of one group is carried out in parallel during one cycle of the ramp signal, that is, $Tz=2^n \times ta$ (1).

During the same time *Tz*, *m*/2 codes of *n* digits plus *y* digits must be transmitted, these *y* digits being used, at the receiver for channel synchronization. If *tb* designates the duration of one digit time slot at transmission, then:

$$Tz=\left(\frac{m}{2} \times n\right)+y \times tb \quad (2)$$

On the other hand, if *Fs* designates the sampling frequency, $Tz=1/2Fs$ (3). The equations (1), (2), and (3) enable to determine the various parameters of operation of the coder according to the invention. By equalizing the equations (1) and (2), there is obtained:

$$\frac{tb}{ta}=\frac{2^n+1}{m \times n+2y} \quad (4)$$

In the general case, the signals of period *ta* and *tb* may be obtained through divider circuits. Thus, one pulse generator generating pulses of period *ta* and one binary divider of capacity $2^n$ defines the period *Tz*.

The system just described enables also to achieve a nonlinear coder according to the principle of the multilinear coder described in the French Pat. No. 1,357,668. In effect, if the values of the division ratios are modified for certain values of the codes written in the coding counter, there is obtained a coding characteristic constituted by a succession of linear segments which may approximate, for instance, a logarithmic curve.

A particular example of achievement of the coder according to the invention will be described now by choosing:

-number of channels: $m=32=2^5$

-number of digits when coding: $n=7$

-number of synchronization digits for *m*/2 channels: $y=16$

With these particular values, from equation (4), $ta=tb$. The number of digits transmitted per cycle *Tz* is $2^n=128$ of which:

$(m/2) \times n=112$ represent the codes related to the *m*/2 channels, $y=16$ are the synchronization digits.

These synchronization digits may be distributed according to various ways, for instance, by adding one digit per channel or by grouping them at the end of the cycle *Tz*.

Figure 5:
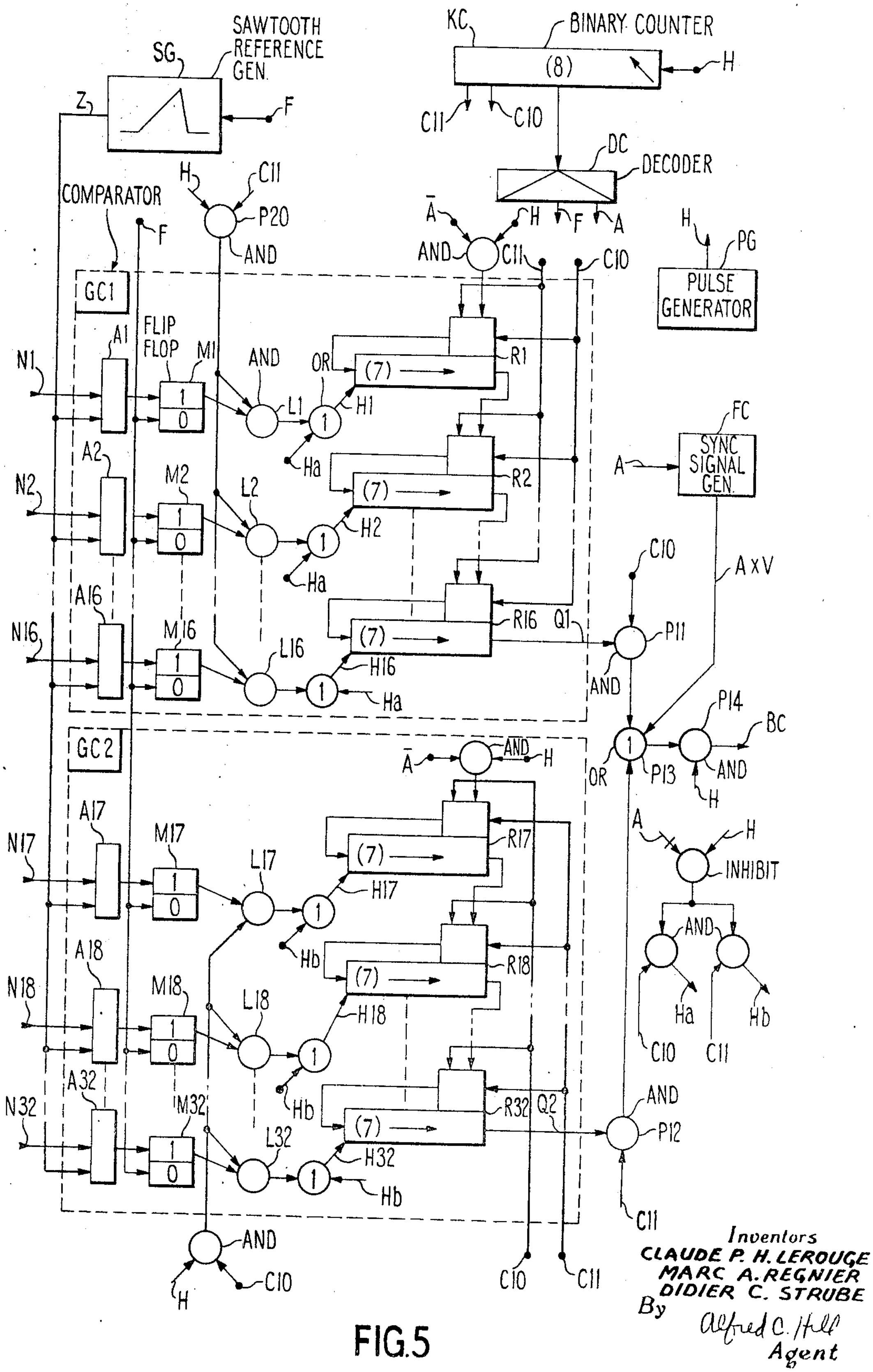
FIG. 5 illustrates the detailed block diagram of the coder.

FIG. 5 illustrates the detailed diagram of the coder according to the invention, which comprises:

Generator PG which delivers clock signals H of period *ta* and of duty factor 0.5.

Natural binary counter KC which receives advance signals H and its associated decoder DC. This counter comprises $n+1$ =8 flip-flops and provides the outputs C11 and C10 corresponding to the outputs 1 and 0 of the most significative flip-flop C1. The less significant flip-flops C2 to C8 store during the cycle $Tz$, the $2^{7}$=128 codes shown in FIG. 4*c*. At the beginning of each cycle, flip-flop C1 switches so that the signals C11 and C10 define, respectively, the odd cycles, such as $Tz1$, and the even cycles, such as $Tz2$ (FIG. 4*d*). Decoder DC delivers first a signal F (FIG. 4*e*) when counter KC stores the code 2*n*/1x127, and second, a signal A each time the flip-flops C6, C7, C8 are simultaneously in the 1 state (division by 8 of the frequency of signals H). It will be noted that the last signal A of a cycle appears just before the beginning of the following cycle.

Generator SG which delivers a signal Z (FIG. 4*d*) the amplitude of which increases linearly with time in the absence of the signal F (FIG. 4*e*). At the end of the cycle, this signal controls the return to zero of the signal Z which increases once again when it is suppressed.

The groups of circuits GC1 and GC2 assigned, respectively, to the channels of the groups G1 (channels N1 to N16) and G2 (channels N17 to N32).

Synchronization signal generator FC which delivers synchronization signals V when a signal A is present (condition A×V). Since *n*x7, this circuit adds one digit per channel.

Transmission gates P11 to P14 which control the transmission of the codes in series form on the output B*c*.

It should be remembered that the coding is carried out, without any sampling of the input signals N1, N2...N32, as the amplitude of the signal Z becomes equal to each of these signals; that each of the circuits GC1, GC2 processes *m*/2x16 channels and that the signals of channels N1 to N16 (N17 to N32) are coded during an odd cycle (even) of the signal Z whereas the signals of the channels N17 to N32 (N1 to N16) are transmitted in series form on the output B*c*.

These two groups GC1 and GC2 are identical and only the circuit GC1 will be described in detail, said circuit including:

Comparators A1 to A16 which receive the input analog signals N1, N2...N16 and the signal Z. Each of these comparators delivers a signal when the ramp signal amplitude becomes higher than that of the input signal.

Flip-flops M1 to M16 set in the 1 state by the signal F (i.e. before the beginning of each cycle) and reset to the 0 state when the associated comparator delivers a signal.

AND gates L1 to L16 energized by a signal H×C11 (AND P20) and which are conductive when the associated flip-flop is in the 1 state. Thus, for instance, H1xM1×H×C11.

Counters and their logic circuits R1 to R16 of the type described in relation with FIGS. 1 and 2.

When a coding signal C11 is applied to the input corresponding to that referenced $\overline{Ca}$ of FIG. 2, each of these registers R1 to R16 operates as a cyclic counter and advances by one position at each signal H1, i.e., as long as the signal C11 is present and the flip-flop M1 is in the 1 state. When the amplitude of signal Z becomes equal to that of signal N1, circuit A1 controls the resetting of the flip-flop M1 to the 0 state, and AND L1 is blocked. The counter of R1 receives no more advance signals H1 (H1=H×C11×M1) and the number written therein represents the code value of analog signal N1.

As it has been seen during the study of FIGS. 1 and 2, the counters connected as cyclic counters have a capacity of 2*n*/1x127 codes (for *n*x7) K1, K2...K127. The storage times of these different codes are shown on FIG. 4*f*.

When the transmission signal C10 and the logical condition $\overline{A}$×H are respectively applied to the inputs corresponding to those referenced *Ca* and *Ma* on FIG. 2, the series connected counters of circuits R1 to R16 operate as shift registers and the codes written therein appear in series form on the output Q1; the shifting being carried out under the control of the advance signals H*a*xA×H×C10. It will be noted that this shifting is stopped when the signal A is present, i.e., during the time of transmission of the synchronization signal by circuit FC (condition A×V).

The signals appearing on the outputs Q1, Q2 of the circuits GC1, GC2, are applied through the gates P11, P12, P13 to AND P14 which delivers a signal for the condition:

*B*cx(*Q*1*PC*10z*Q*2*PC*11)×$\overline{A}$z*V*×*A*.

During the transmission, a digit 1 is written in the first flip-flop of the counter of circuit R1 each time the contents of the counters are shifted by one position so that, at the end of the transmission, all the counters of the circuit GC1 contain the code K1 (digit 1 at all the positions) which corresponds to the zero code of the counter KC.

Figure 6:
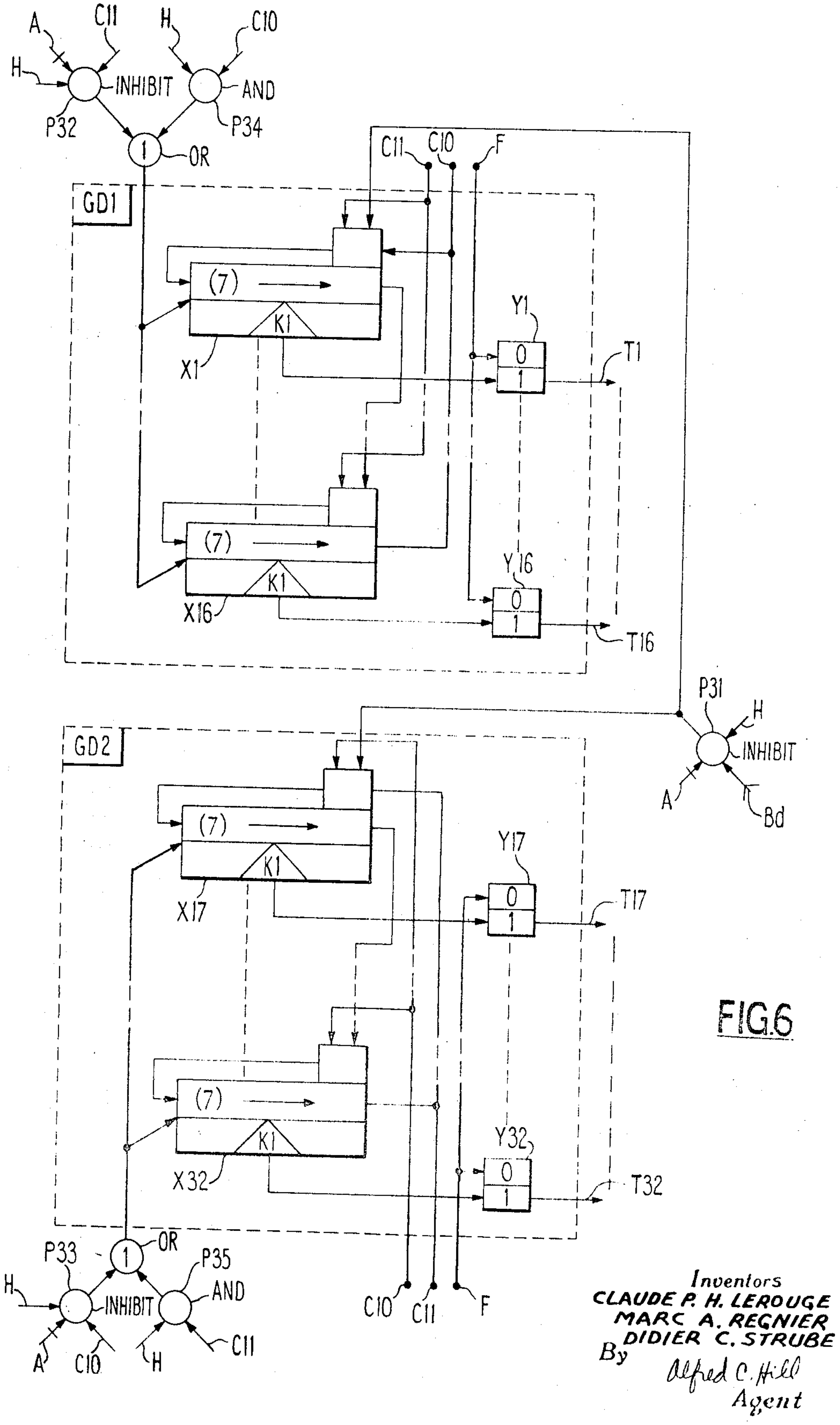
FIG. 6 illustrates the detailed block diagram of the decoder.

FIG. 6 illustrates the detailed diagram of the decoder according to the invention, the operation of which is complementary to that of the coder. It uses a clock signal generator PG and a counter KC with the associated decoder DC which are identical to those shown on FIG. 5, and which have not been represented on this figure.

This decoder comprises the groups of circuits GD1 and GD2, assigned, respectively, to the channels of the groups G1 (outputs T1 to T16) and G2 (outputs T17 to T32) and the input gate P31 to which are applied, on the input B*d*, the coded signals received in series form. The circuits X1 to X16 and X17 to X32 are of the type symbolically illustrated in FIG. 3 and the counters therein may be connected either as shift registers or as cyclic counters according to the signals applied to the control inputs. To each circuit is coupled a flip-flop Y1 to Y16, Y17 to Y21, set to the 0 state by signal F.

In the group of circuits GD1, the connection as shift register is carried out under the control of the signal C11 (FIG. 7*a*) and the 128 digits received on the input B*d* are serially written in the 16 counters (see FIG. 7*d*) when the logical condition B*dP*$\overline{A}$× is fulfilled (gate P31), the advance signals being supplied by gate P32 (logical condition H×$\overline{A}$×C11). The signal A which coincides with a synchronization digit, controls the blocking of gates P31 and P32, so that only the code digits are written in the counters.

When signal C10 (FIG. 7*b*) appears, each of the counters of circuits X1 to X16 operates separately as a counter in assuring the decoding, the advance signals being delivered by the gate P34 (logical condition H×C10).

Figures 7A, 7B, 7C, 7D, 7E, 7F:
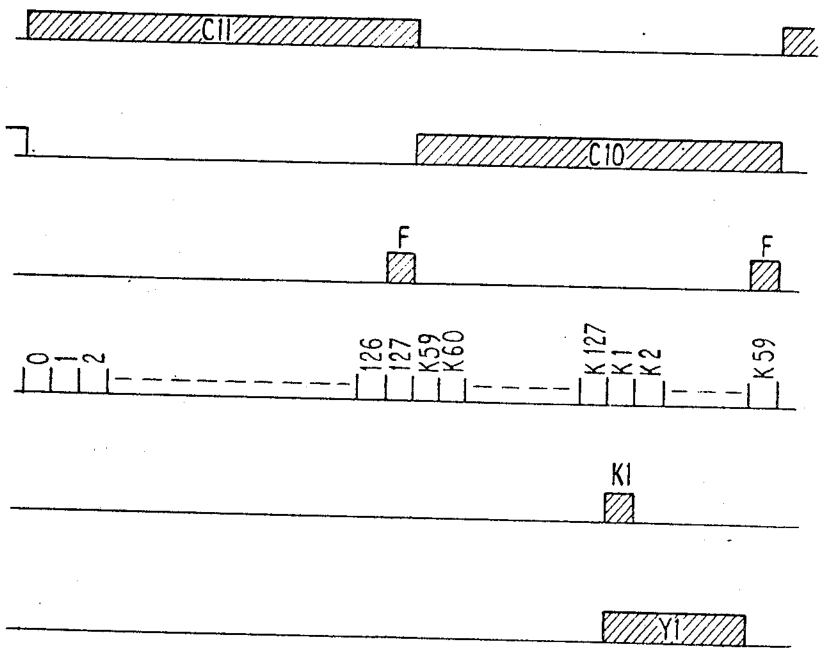
FIGS. 7*a* to 7*f* illustrate diagrams of signals related to the operation of the decoder.

In order to describe the decoding process, it will be assumed that the counter of circuit X1 contains the code K59 (FIG. 7*d*). At each signal H this code advances by one position and reaches the value K 127, then the value K1. At this time the associated decoder delivers a signal K1 (FIG. 7*e*) which controls the setting of flip-flop Y1 into the 1 state (FIG. 7*f*). The code written in the counter advances further up to the time where signal F appears, which controls the setting of flip-flop Y1 to the 0 state.

By examining FIG. 7, *it is seen that the time during which flip-flop Y1 is in the* 1 state is proportional to the value of the code, and that this signal represents the value of the code in pulse-width modulation PWM which is easily translated in a known manner (charging a condenser and filtering) into amplitude modulation.

While we have described above the principles of our invention in connection with specific apparatus, it is to be clearly understood that this description is made only by way of example and not as a limitation of the scope of our invention as set forth in the objects thereof and the accompanying claims.

We claim:

1. A converter comprising:

a source of timing signals defining a first given time interval and a second given time interval different than said first time interval;

binary counting means having an input and a plurality of outputs; a source of shift pulses coupled to the counting means and logic circuit means including an exclusive OR circuit coupled to said counting means and said source of timing signals, said logic circuit means responding to said timing signals to connect at least one of the outputs of said counting means to the input of said counting means to form a cyclic counter for one of said first and second time intervals and to disconnect the feedback from the said outputs to the said input and to connect said counting means as a shift register for the other of said first and second time intervals 2. A converter according to claim 1, wherein
said counting means includes
a plurality of binary counters; and
said logic circuit means includes
a plurality of logic circuits, each of said logic circuits being coupled to a different one of said counters and in common to said source, each of said logic circuits responding to said timing signals to connect at least one of the outputs to the input of each of said counters to form separate cyclic counters for one of said first and second time intervals and to connect each of said counters as a shift register and in series with each other for the other of said first and second time intervals.

3. A converter according to claim 1, wherein
said counting means includes
a first group of a plurality of binary counters, and
a second group of a plurality of binary counters; and
said logic circuit means includes
a first group of a plurality of logic circuits, each of said first group of logic circuits being coupled to a different one of said first group of counters and in common to said source, and
a second group of a plurality of logic circuits, each of said second group of logic circuits being coupled to a different one of said second group of counters and in common to said source,
each of said first group of logic circuits responding to said timing signals to connect each of said first group of counters as a cyclic counter for said first time interval and to connect each of said first group of counters as a shift register and in series with each other for said second time interval, and
each of said second group of logic circuits responding to said timing signals to connect each of said second group of counters as a shift register and in series with each other for said first time interval and to connect each of said second group of counters as a cyclic counter for said second time interval.

4. A converter according to claim 3, wherein
each of said counters of each of said first and second groups include
*n* JK flip-flops, where *n* is an integer greater than one equal to the number of digits in a digital code.

5. A converter according to claim 3, further including
a plurality of analog signal inputs, each of said inputs being associated with a different one of said counters of said first and second groups of said counters;
a reference signal generator coupled to said source;
a plurality of amplitude comparators, each of said comparators being coupled in common to said generator, a different one of said inputs and a different one of said logic circuits of said first and second groups to enable said first group of counters to code their associated analog signals during said first time interval and to enable said second group of counters to code their associated analog signals during said second time interval; and
gate means coupled to said source and the last counter of each of said first and second groups of counters to provide as an output signal serial, digital codes from said second group of counters during said first time interval and serial, digital codes from said first group of counters during said second time interval.

6. A converter according to claim 5, further including
a sync signal generator coupled to said source and said gate means to insert said sync signal into said output signal.

7. A converter according to claim 5, wherein
said reference signal generator includes
a sawtooth generator providing a sawtooth waveform during each of said first and second time intervals.

8. A converter according to claim 5, wherein
each of said counters of said first and second groups include
*n* JK flip-flops, where *n* is an integer greater than one equal to the number of digits in a digital code.

9. A converter according to claim 3, further including
input means for serial digital codes coupled to the first logic circuit of each of said first and second groups of logic circuits to load each of said second group of counters with an associated digital code during said first time interval and to load each counter of said first group of counters with an associated digital code during said second time interval;
a plurality of analog outputs, each of said outputs being associated with a different one of said counters of said first and second groups of said counters;
a plurality of decoders, each of said decoders being coupled to a different one of said counters of said first and second groups of said counters; and
a plurality of bistable devices, each of said devices being coupled in common to said source and between a different one of said decoders and a different one of said outputs to provide an analog output signal on said outputs associated with each of said first group of counters during said first time interval and to provide an analog output signal on said outputs associated with each of said second group of counters during said second time interval.

10. A converter according to claim 9, wherein
each of said devices includes
a flip flop providing a pulse width modulated output.